US012654628B1

(12) United States Patent
    Dunmoodie

(10) Patent No.: US 12,654,628 B1
(45) Date of Patent: Jun. 16, 2026

(54) AUTOMOBILE HEADS-UP DISPLAY DEVICE FOR PROJECTING A MAP ON A WINDSHIELD

(71) Applicant: Joshua Dunmoodie, Fort Worth, TX (US)

(72) Inventor: Joshua Dunmoodie, Fort Worth, TX (US)

( * ) Notice: Subject to any disclaimer, the term of this patent is extended or adjusted under 35 U.S.C. 154(b) by 0 days.

(21) Appl. No.: 19/053,162

(22) Filed: Feb. 13, 2025

(51) Int. Cl.
    | | |
    |---|---|
    | *B60R 11/02* | (2006.01) |
    | *B60K 35/23* | (2024.01) |
    | *B60R 11/00* | (2006.01) |
    | *G02B 27/01* | (2006.01) |
    | *G08G 1/0968* | (2006.01) |
    | *G08G 1/0969* | (2006.01) |
    | *G09G 3/00* | (2006.01) |

(52) U.S. Cl.
    CPC .......... *B60R 11/0229* (2013.01); *B60K 35/23* (2024.01); *G02B 27/0149* (2013.01); *G08G 1/096877* (2013.01); *G08G 1/096883* (2013.01); *G08G 1/0969* (2013.01); *G09G 3/001* (2013.01); *B60K 2360/166* (2024.01); *B60K 2360/589* (2024.01); *B60K 2360/779* (2024.01); *B60K 2360/828* (2024.01); *B60R 2011/0033* (2013.01); *B60R 2011/0059* (2013.01); *B60R 2011/0078* (2013.01); *G09G 2354/00* (2013.01); *G09G 2380/10* (2013.01)

(58) Field of Classification Search
    CPC ......... B60R 11/0229; B60R 2011/0033; B60R 2011/0059; B60R 2011/0078; B60K 35/23; B60K 2360/166; B60K 2360/589; B60K 2360/779; B60K 2360/828; G02B 27/0149; G08G 1/096877; G08G 1/096883; G08G 1/0969; G09G 3/001; G09G 2354/00; G09G 2380/10
    See application file for complete search history.

(56) References Cited

U.S. PATENT DOCUMENTS

| | | | |
|---|---|---|---|
| D798,783 S | 10/2017 | Li | |
| 10,247,944 B2 | 4/2019 | Amaru | |
| 2006/0209190 A1* | 9/2006 | Walters | ......... H04N 7/181 |
| | | | 348/E7.086 |
| 2007/0146235 A1 | 6/2007 | Nolan | |
| 2009/0189831 A1 | 7/2009 | Chevion | |

(Continued)

FOREIGN PATENT DOCUMENTS

WO    WO2015095849    6/2015

*Primary Examiner* — Brent D Castiaux

(57) ABSTRACT

An automobile heads-up display device for projecting a map on a windshield includes a coupler and a housing. The coupler is removably couplable to a rear-view mirror. The housing is attached to the coupler and includes a front and rear faces. The front face is positioned facing away from the coupler. The rear face is positioned facing toward the coupler. A transceiver is positioned in the housing. The transceiver is wirelessly connectable to a global positioning system. A projector is positioned in the housing and facing out of the front face of the housing. The projector projects a map on a windshield of the automobile. A microprocessor is positioned in the housing. The microprocessor is connected to the transceiver and the projector to control the projector to display navigational information from the global positioning system. A battery is disposed in the housing to supply power.

14 Claims, 6 Drawing Sheets

(56)　　　　　　References Cited

U.S. PATENT DOCUMENTS

| | | | |
|---|---|---|---|
| 2010/0066644 A1 | 3/2010 | Souluer | |
| 2012/0259546 A1 | 10/2012 | Kim | |
| 2014/0368922 A1* | 12/2014 | Tohda | B60K 35/22 |
| | | | 359/630 |
| 2015/0045097 A1* | 2/2015 | Ignomirello | B60R 11/0241 |
| | | | 455/575.9 |
| 2015/0238035 A1* | 8/2015 | Montgomery | A47G 25/483 |
| | | | 223/96 |
| 2018/0277028 A1* | 9/2018 | Mader | G09G 3/001 |
| 2020/0132489 A1 | 4/2020 | DeMars | |

* cited by examiner

AUTOMOBILE HEADS-UP DISPLAY DEVICE FOR PROJECTING A MAP ON A WINDSHIELD

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to heads-up displays and more particularly pertains to a new automobile heads-up display device for projecting a map on a windshield. Most heads-up displays are integrated into modern automobiles. In addition, many modern automobiles include global-positioning system (GPS) maps on display screens on dashboards of the automobile. However, not all automobiles have such technology. The new automobile heads-up display device is detachably mountable on a rearview mirror, which is present on most any automobile of any model year, and projects a GPS navigation map on the windshield.

(2) Description of Related Art Including Information Disclosed Under 37 CFR 1.97 and 1.98

The prior art relates to heads-up displays. The prior art, as best understood, does not disclose an automobile heads-up display device for projecting a map on a windshield that includes a coupler designed to be removably coupled to a rear-view mirror of an automobile. The automobile heads-up display device also includes a transceiver that is wirelessly connectable to a global positioning system and a projector that is designed to project a map on a windshield of the automobile.

BRIEF SUMMARY OF THE INVENTION

An embodiment of the disclosure meets the needs presented above in a automobile heads-up display device generally comprising a coupler and a housing. The coupler is designed to be removably coupled to a rear-view mirror of an automobile. The housing is attached to the coupler. The housing includes a front face and a rear face. The front face is positioned facing away from the coupler. The rear face is positioned facing toward the coupler and is positionable facing toward a back surface of the rear-view mirror. A transceiver is positioned in the housing. The transceiver is wirelessly connectable to a global positioning system. A projector is positioned in the housing and facing out of the front face of the housing. The projector is designed to project a map on a windshield of the automobile. A microprocessor is positioned in the housing. The microprocessor is connected to the transceiver and the projector to control the projector to display navigational information from the global positioning system. A battery is disposed in the housing. The battery is connected to the transceiver, the projector, and the microprocessor to supply power.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
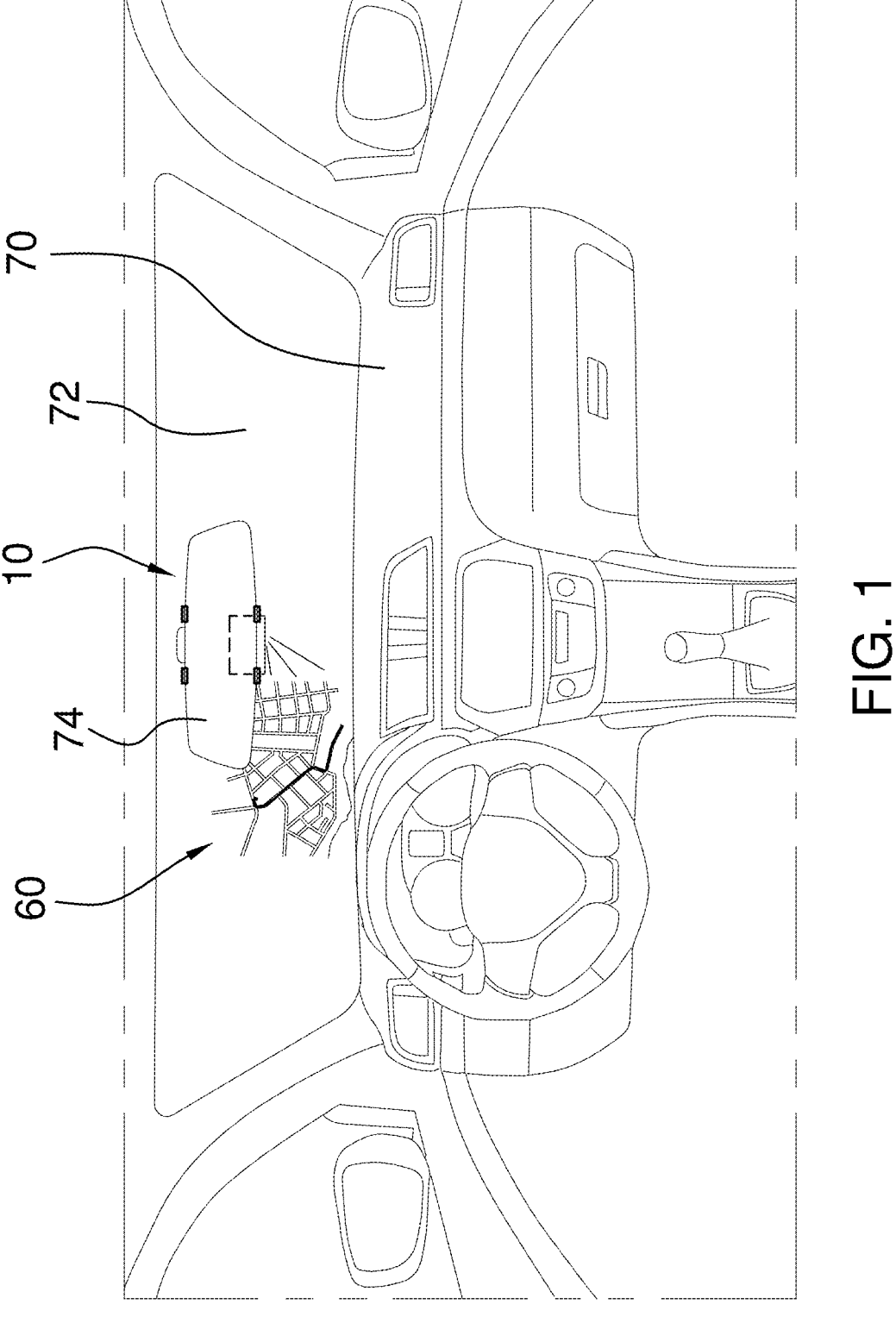
FIG. 1 is a rear view of an automobile heads-up display device according to an embodiment of the disclosure in use.
Figure 2:
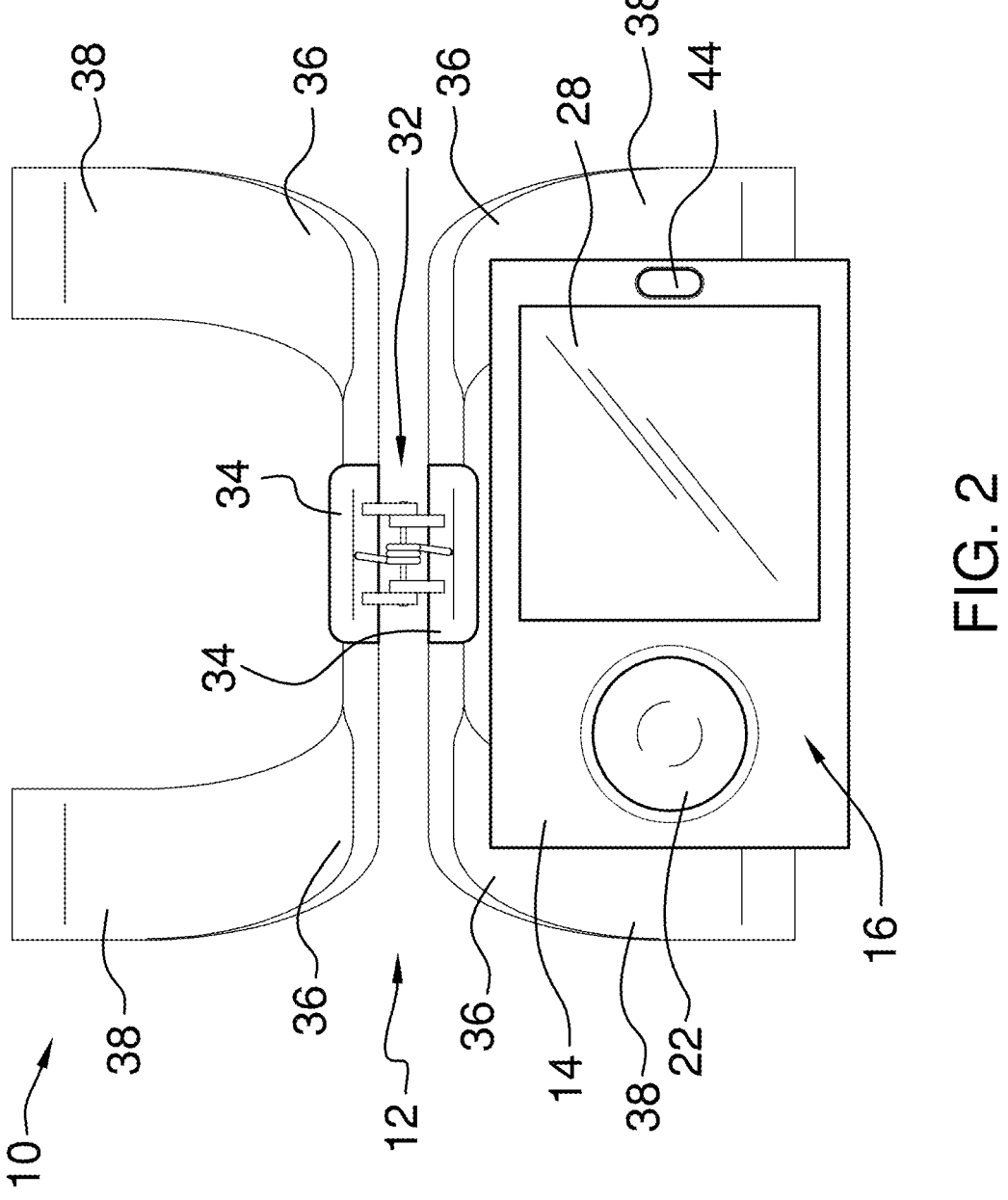
FIG. 2 is a front view of an embodiment of the disclosure.

With reference now to the drawings, and in particular to FIGS. 1 through 6 thereof, a new automobile heads-up display device embodying the principles and concepts of an embodiment of the disclosure and generally designated by the reference numeral 10 will be described.

As best illustrated in FIGS. 1 through 6, the automobile heads-up display device 10 for projecting a map 60 on a windshield 72 generally comprises a coupler 12 and a housing 14. The coupler 12 is designed to be removably coupled to a rear-view mirror 74 of an automobile 70. The housing 14 is attached to the coupler 12. The housing 14 includes a front face 16 and a rear face 18. The front face 16 is positioned facing away from the coupler 12. The rear face 18 is positioned facing toward the coupler 12 and is positionable facing toward a back surface of the rear-view mirror 74. A transceiver 20 is positioned in the housing 14. The transceiver 20 is wirelessly connectable to a global positioning system. A projector 22 is positioned in the housing 14 and facing out of the front face 16 of the housing 14. The projector 22 is designed to project a map 60 on a windshield 72 of the automobile 70. A microprocessor 24 is positioned in the housing 14. The microprocessor 24 is connected to the transceiver 20 and the projector 22 to control the projector 22 to display navigational information from the global positioning system. A battery 26 is disposed in the housing 14. The battery 26 is connected to the transceiver 20, the projector 22, and the microprocessor 24 to supply power.

The automobile heads-up display device 10 further includes a display screen 28 that is positioned in the housing 14 and facing out of the front face 16 of the housing 14. The display screen 28 is a touch screen designed for input of instructions. The display screen 28 is connected to the microprocessor 24 to display navigational information. The display screen 28 could also show additional information, such as time, date, weather, and other such useful information.

The microprocessor 24 is designed to automatically turn off the display screen 28 when the display screen 28 is not in active use. This way the display screen 28 does not reflect light or images off of the windshield 72 when the automobile heads-up display device 10 is in use.

In the exemplary embodiment shown in FIGS. 2 through 6, the coupler 12 includes a pair of clips 30 and a hinge 32. The hinge 32 is positioned to pivotably connect the clips 30. The hinge 32 is spring-loaded to bias the clips 30 together and provide a clamping force on the rear-view mirror 74 when the clips 30 are pivoted apart and placed in engagement with an upper edge and a lower edge of the rear-view mirror 74.

Figure 4:
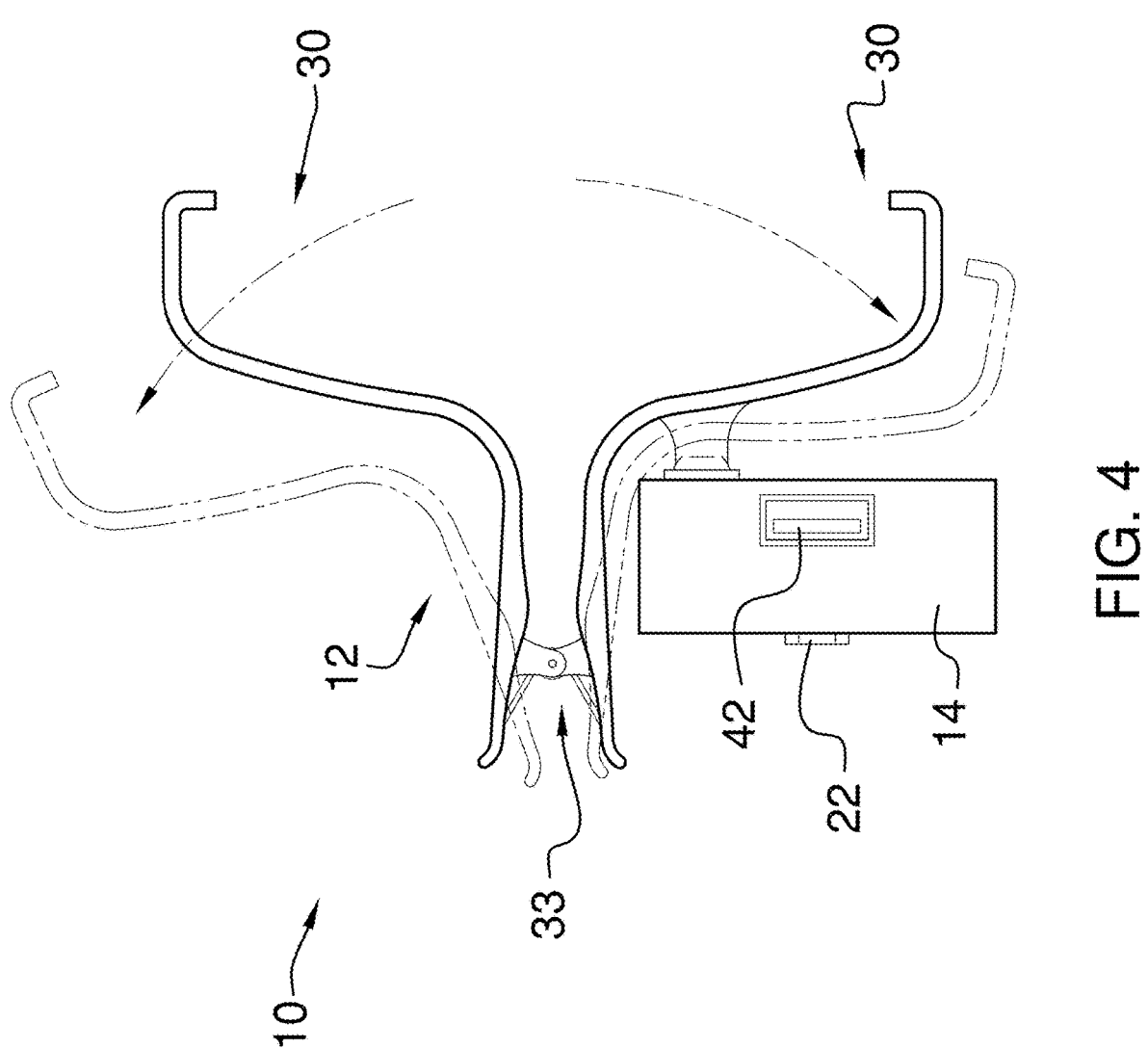
FIG. 4 is a side view of an embodiment of the disclosure.
Figure 5:
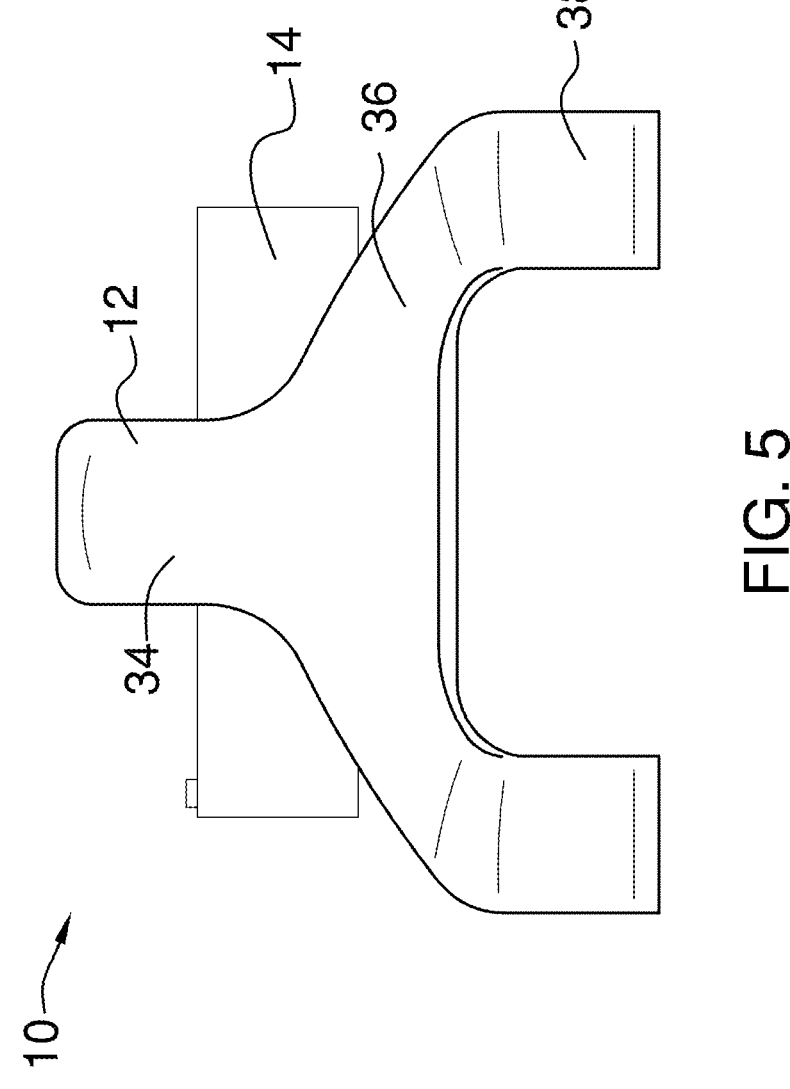
FIG. 5 is a top view of an embodiment of the disclosure.
Figure 6:
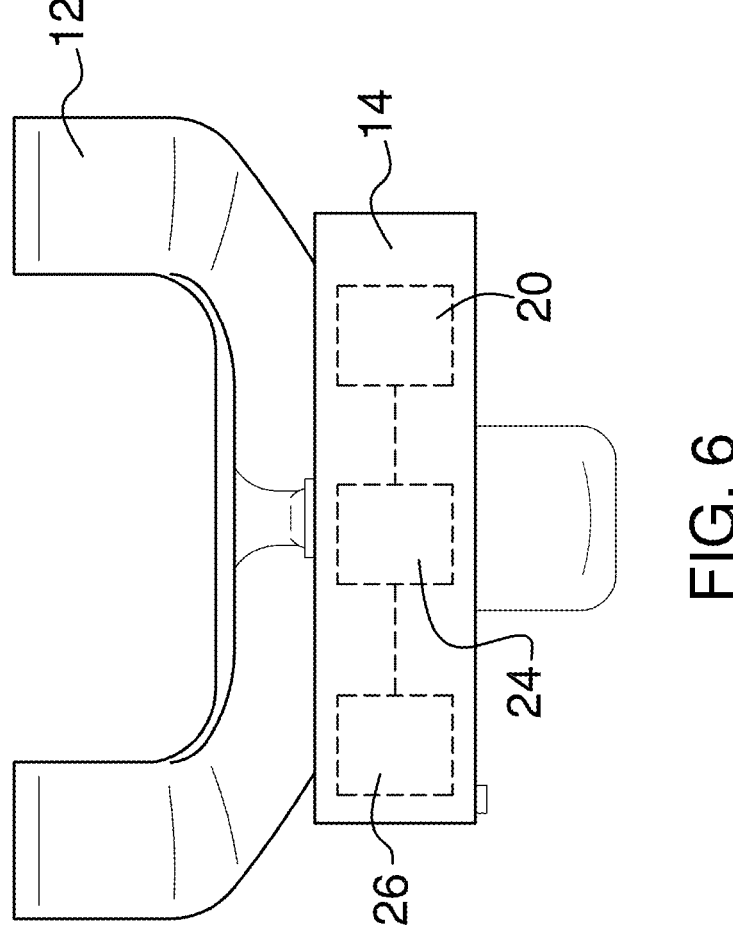
FIG. 6 is a bottom view of an embodiment of the disclosure.

In the exemplary embodiment, each of the clips 30 includes a tab 34 and a curved portion 36 attached to the tab 34. The tab 34 is attached to the hinge 32 and designed to be manually engaged to pivot its respective one of the clips 30. A pair of arms 38 extends from the curved portion 36 in a direction transverse to the tab 34. A pair of lip portions 40 extends from and transverse to a respective one of the arms 38, wherein each of the lip portions 40 is designed to engage a respective one of the upper edge and the lower edge of the rear-view mirror 74. As shown in FIG. 4, each of the lip portions 40 is L-shaped with a slight overhang. The housing 14 is attached to the curved portion 36 of one of the clips 30, specifically the lower of the two. This design is only an exemplary embodiment and other designs of the coupler 12 are within the scope of the disclosure. For example, two sliding pieces with a locking structure could be used, or possibly elastic or fabric wrap or sleeve could be used. The spacing between the arms 38 should be sufficient to accommodate most support bars on which the rear-view mirror 74 is mounted.

In one possible embodiment, the transceiver 20 is also designed to wirelessly receive instructions from a personal electronic device, such as a smartphone or laptop, which could be paired or connected using Bluetooth® technology.

The automobile heads-up display device 10 further includes a charging port 42 that is positioned in the housing 14 and connected to the battery 26. The charging port 42 could be a USB-style charging port and the battery 26 is rechargeable. The automobile heads-up display device 10 further includes a power button 44 that is positioned in the front face 16 of the housing 14. The power button 44 could be used to power the automobile heads-up display device 10 on and off, and possibly to activate the Bluetooth® technology for pairing.

Figure 3:
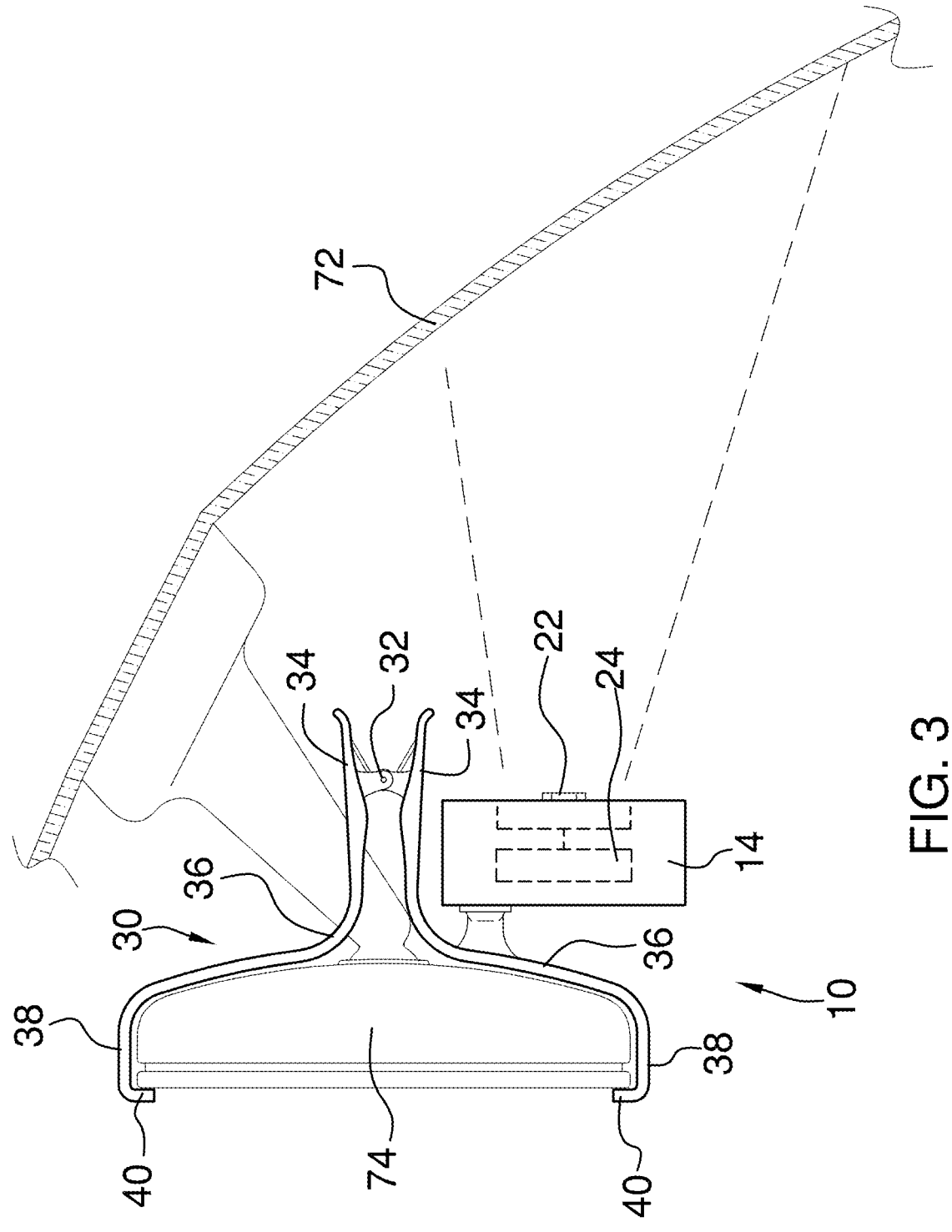
FIG. 3 is a side view of an embodiment of the disclosure in use.

FIGS. 1 and 3 show the automobile heads-up display device 10 in use. The coupler 12 is connected to the rear-view mirror 74. The user programs in a destination using the display screen 28, or possibly a personal electronic device. The navigation map 60 based on the information received from a global positioning system is then projected onto the windshield 72 so that the driver can view the navigation information as he drives. It should be noted that the map 60 could be projected over a relatively small portion of the windshield 72 so as to not obstruct the vision of the driver. When done using the automobile heads-up display device 10, the user can easily remove it from the rear-view mirror 74 if desired.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An automobile heads-up display device for projecting a map on a windshield comprising:
   a coupler being configured to be removably coupled to a rear-view mirror of an automobile;
   a housing being attached to said coupler, said housing including a front face and a rear face, said front face being positioned facing away from said coupler, said rear face being positioned facing toward said coupler and being positionable facing toward a back surface of the rear-view mirror;
   a transceiver being positioned in said housing, said transceiver being wirelessly connectable to a global positioning system;
   a projector being positioned in said housing and facing out of said front face of said housing, said projector being configured to project a map on a windshield of the automobile;
   a microprocessor being positioned in said housing, said microprocessor being connected to said transceiver and said projector to control said projector to display navigational information from the global positioning system;
   a battery being disposed in said housing, said battery being connected to said transceiver, said projector, and said microprocessor to supply power;
   wherein said coupler includes a pair of clips and a hinge;
   wherein said hinge is positioned to pivotably connect said clips; and
   wherein said hinge is spring-loaded to bias said clips together and provide a clamping force on the rear-view mirror when said clips are pivoted apart and placed in engagement with an upper edge and a lower edge of the rear-view mirror.

2. The automobile heads-up display device of claim 1, further comprising a display screen positioned in said housing and facing out of said front face of said housing, said display screen being a touch screen configured for input of instructions, said display screen being connected to said microprocessor to display navigational information.

3. The automobile heads-up display device of claim 2, wherein said microprocessor is configured to automatically turn off said display screen when said display screen is not in active use.

4. The automobile heads-up display device of claim 1, wherein each of said clips includes:

a tab attached to said hinge and configured to be manually engaged to pivot its respective one of said clips;

a curved portion attached to said tab;

a pair of arms extending from said curved portion in a direction transverse to said tab; and a pair of lip portions extending from and transverse to a respective one of said arms, wherein each of said lip portions is configured to engage a respective one of the upper edge and the lower edge of the rear-view mirror.

5. The automobile heads-up display device of claim 4, wherein said housing is attached to said curved portion of one of said clips.

6. The automobile heads-up display device of claim 1, wherein said transceiver is configured to wirelessly receive instructions from a personal electronic device.

7. The automobile heads-up display device of claim 1, further comprising a charging port being positioned in said housing and connected to said battery.

8. The automobile heads-up display device of claim 1, further comprising a power button being positioned in said front face of said housing.

9. An automobile heads-up display device for projecting a map on a windshield comprising:

a coupler being configured to be removably coupled to a rear-view mirror of an automobile;

a housing being attached to said coupler, said housing including a front face and a rear face, said front face being positioned facing away from said coupler, said rear face being positioned facing toward said coupler and being positionable facing toward a back surface of the rear-view mirror;

a transceiver being positioned in said housing, said transceiver being wirelessly connectable to a global positioning system;

a projector being positioned in said housing and facing out of said front face of said housing, said projector being configured to project a map on a windshield of the automobile;

a microprocessor being positioned in said housing, said microprocessor being connected to said transceiver and said projector to control said projector to display navigational information from the global positioning system;

a battery being disposed in said housing, said battery being connected to said transceiver, said projector, and said microprocessor to supply power;

a display screen positioned in said housing and facing out of said front face of said housing, said display screen being a touch screen configured for input of instructions, said display screen being connected to said microprocessor to display navigational information;

wherein said microprocessor is configured to automatically turn off said display screen when said display screen is not in active use;

wherein said coupler includes a pair of clips and a hinge;

wherein said hinge is positioned to pivotably connect said clips; and wherein said hinge is spring-loaded to bias said clips together and provide a clamping force on the rear-view mirror when said clips are pivoted apart and placed in engagement with an upper edge and a lower edge of the rear-view mirror.

10. The automobile heads-up display device of claim 9, wherein each of said clips includes:

a tab attached to said hinge and configured to be manually engaged to pivot its respective one of said clips;

a curved portion attached to said tab;

a pair of arms extending from said curved portion in a direction transverse to said tab; and a pair of lip portions extending from and transverse to a respective one of said arms, wherein each of said lip portions is configured to engage a respective one of the upper edge and the lower edge of the rear-view mirror.

11. The automobile heads-up display device of claim 10, wherein said housing is attached to said curved portion of one of said clips.

12. The automobile heads-up display device of claim 11, wherein said transceiver is configured to wirelessly receive instructions from a personal electronic device.

13. The automobile heads-up display device of claim 12, further comprising a charging port being positioned in said housing and connected to said battery.

14. The automobile heads-up display device of claim 13, further comprising a power button being positioned in said front face of said housing.

* * * * *